United States Patent
Hall et al.

(10) Patent No.: US 7,366,796 B2
(45) Date of Patent: Apr. 29, 2008

(54) METHOD AND LEVELS OF PING NOTIFICATION

(75) Inventors: Gary Hall, Redmond, WA (US); Selvaraj Nalliah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 10/645,793

(22) Filed: Aug. 21, 2003

(65) Prior Publication Data

US 2004/0088390 A1  May 6, 2004

Related U.S. Application Data

(60) Provisional application No. 60/423,902, filed on Nov. 5, 2002.

(51) Int. Cl.
*G06F 15/16* (2006.01)
(52) U.S. Cl. .................................................. 709/248
(58) Field of Classification Search ................ 709/248, 709/227–228, 220–222, 206; 455/466, 412.2
See application file for complete search history.

(56) References Cited

U.S. PATENT DOCUMENTS

| | | | |
|---|---|---|---|
| 6,959,194 B2 * | 10/2005 | Brouwer et al. | 455/466 |
| 2002/0046296 A1 * | 4/2002 | Kloba et al. | 709/248 |
| 2002/0052916 A1 * | 5/2002 | Kloba et al. | 709/203 |
| 2003/0050046 A1 * | 3/2003 | Conneely et al. | 455/412 |
| 2003/0157947 A1 * | 8/2003 | Fiatal et al. | 455/466 |
| 2004/0064445 A1 * | 4/2004 | Pfleging et al. | 707/3 |
| 2004/0166832 A1 * | 8/2004 | Portman et al. | 455/412.1 |
| 2006/0003780 A1 * | 1/2006 | Mamdani et al. | 455/466 |

OTHER PUBLICATIONS

"AllNetDevices:—Notification Service Support SMS," http://www.allnetdevices.com/icom_cgi/print/print.cgi?url=http://www.allnetdevices.com/. . . Jun. 12, 2003.
Gregory, Shirley Siluk, "Pumatech Pounces on Business Info Personalization, "Mar. 19, 2001, http://www.newsfactor.com/perl/printer/8268/.
"Pumatech Announces Mind-It® Software Version 5.2,"http://www.pumatech.com/press_releases/112701.html Jun. 12, 2003.
"Making Exchange Mobile with MIS," http://www.mobile-and-wireless.com/Articles/Index.cfm?ArticleID=23520&pg=1&show+. . . Jun. 12, 2003.

* cited by examiner

*Primary Examiner*—Salad Abdullahi
(74) *Attorney, Agent, or Firm*—Theodore M. Magee; Westman, Champlin & Kelly, P.A.

(57) ABSTRACT

A method is provided for sending notifications to a mobile device to indicate that there is data on a computing device to be synchronized. Under one embodiment, the notification is sent as a short message service message. Multiple levels of notification are possible with the lowest level indicating only that there is data to be synchronized and the highest level identifying the object that changed and the content of the change.

13 Claims, 9 Drawing Sheets

METHOD AND LEVELS OF PING NOTIFICATION

REFERENCE TO RELATED APPLICATIONS

The present application claims priority from U.S. Provisional Application 60/423,902 filed Nov. 5, 2002 and entitled "Methods and Levels of Ping Notification".

BACKGROUND OF THE INVENTION

The present invention relates to synchronization of objects between object stores on two different computing devices. More particularly, the present invention relates to synchronization on mobile devices.

Mobile devices include a broad range of computing and communication devices that are small enough to be conveniently carried by a user. Examples of such devices include mobile phones, personal digital assistants, tablet PCs, and lap-top PCs.

While a wide variety of computing tasks and applications can be performed by such mobile devices, personal information managers (PIMs) are particularly well suited to mobile devices. PIMs typically comprise applications that enable the user of the mobile device to better manage scheduling and communications, and other such tasks. Some commonly available PIMs include scheduling and calendar programs, task lists, address books, and electronic mail (e-mail) programs. Some commonly commercially available PIMs are sold under the trademarks "MICROSOFT SCHEDULE+" and "MICROSOFT OUTLOOK" and are commercially available from Microsoft Corporation of Redmond, Wash.

In addition to PIMs, mobile devices may also run different types of applications, such as word processors, spread sheets, etc.

To provide users with as much freedom as possible, it is desirable to allow the user to access and change their application and PIM information from any device they choose. Thus, the user should be able to access their e-mail from a network terminal, a PDA, and a tablet PC.

However, allowing the user to access and change their information from any desired source means that the devices must be able to communicate with each other to indicate changes to the information. The process of two devices sharing changes in the application and/or PIM information is known as synchronization.

In general, synchronization is not a continuous process. In other words, a mobile device does not continually try to synchronize its data because that would waste limited wireless bandwidth and place an undue drain on the mobile device's battery. Instead, synchronization is performed periodically. In addition, since the mobile device is not always in use, it is wasteful to have a server or desktop computer periodically attempt to establish a connection with the mobile device to perform synchronization. Instead, the mobile device is responsible for establishing a connection to perform synchronization.

Because the mobile device does not know if information has changed on a server or desktop computer until the synchronization has begun, the mobile device must periodically poll the server or desktop to see if synchronization is needed. This polling wastes wireless bandwidth and battery usage.

Thus, a system is needed that allows mobile devices to determine when to synchronize without wasting wireless bandwidth or battery usage.

Some systems have provided notifications to mobile devices to indicate when Internet pages have changed. However, these devices simply shift the polling procedures onto another computer, which must access the Internet periodically to request the marked pages and to check to see if they have changed. Thus, an intermediary computing device is used to monitor the web pages. Such intermediary devices have not been used with synchronization data because access to synchronized data has been limited to the computing devices that actually share the data to minimize data corruption and to prevent unauthorized distribution of the synchronization data. As such, a notification system is needed that can be applied to synchronization data.

SUMMARY OF THE INVENTION

A method is provided for sending notifications to a mobile device to indicate that there is data on a computing device to be synchronized. Under one embodiment, the notification is sent as a short message service message. Multiple levels of notification are possible with the lowest level indicating only that there is data to be synchronized and the highest level identifying the object that changed and the content of the change.

DETAILED DESCRIPTION OF THE ILLUSTRATIVE EMBODIMENTS

Overview

Figure 1:
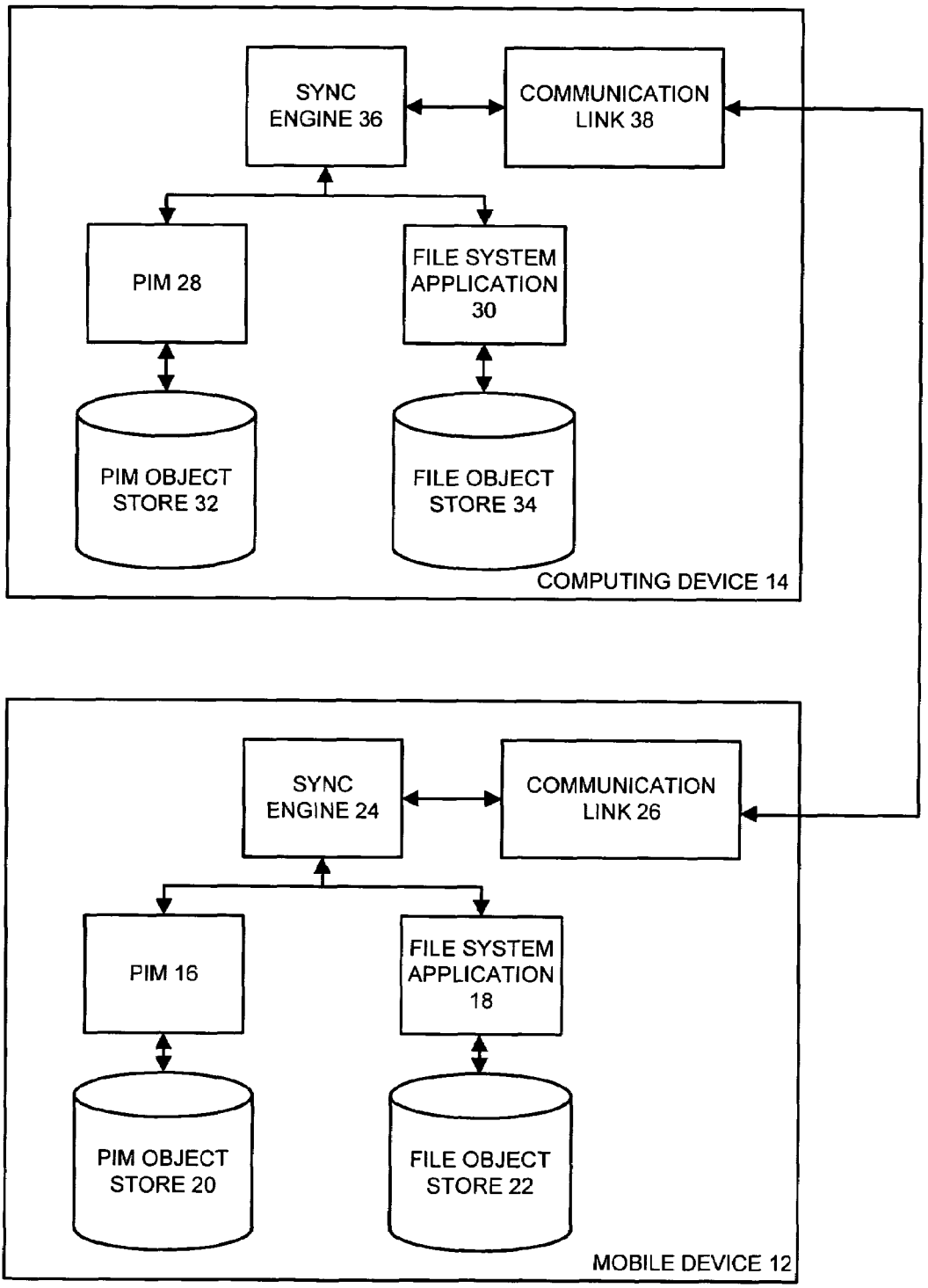
FIG. 1 is a block diagram illustrating a basic environment of the present invention.

FIG. 1 is a block diagram of a typical system or environment 10 in which the present invention operates. System 10 includes mobile device 12 and a computing device 14. Mobile device 12 includes first application program 16, second application program 18, corresponding first and second object stores 20 and 22, synchronization engine 24 and communication link 26. Computing device 14 includes first and second application programs 28 and 30, corresponding first and second object stores 32 and 34, synchronization engine 36 and communication link 38. It will be appreciated that both mobile device 12 and computing device 14 include a number of other components, which are discussed in greater detail below.

In one illustrative embodiment of the present invention, application programs 16 and 28 are personal information manager (PIM) programs, which support, for example, electronic mail messaging, scheduling, calendaring, etc. Hereinafter, programs 16 and 28 will simply be referred to as PIMs 16 and 28. Of course, PIMs 16 and 28 can be configured to support a wide variety of other features, such as task lists and personalized address books, to name a few.

Object stores 20 and 32 are implemented in memory configured to store a plurality of individual records or objects, each comprising a plurality of fields or properties related to PIMs 16 and 28. In one illustrative embodiment, PIMs 16 and 28 are programs, such as that available under the commercial designation "MICROSOFT OUTLOOK", and object stores 20 and 23 are configured to store objects, each of which having a plurality of attributes or properties associated with electronic mail messaging, such as a sender's name, the recipient's name, text messages, etc. Computing device 14 executes PIM 28 to maintain objects stored in store 32, and mobile device 12 executes program 16 to maintain objects stored in object store 20. In one illustrative embodiment, each object in object store 20 comprises the same set of properties or attributes stored in object store 32, or a subset of those properties or attributes.

Similarly, application programs 18 and 30 maintain objects on associated object stores 22 and 34, respectively. In one illustrative embodiment, application programs 18 and 30 are file system applications, such as those available under the commercial designation "MICROSOFT WORD". It should also be noted that any suitable number of other application programs, and associated object stores, can be provided on mobile device 12 and computing device 14. However, for the sake of simplicity, only programs 16, 18, 28 and 30, and their associated object stores, are described herein.

In one illustrative embodiment, the user desires to synchronize object stores 20 and 32 and object stores 22 and 34. Thus, there are two instances of each object associated with the pair of object stores 20 and 32 (one instance in object store 20 and one instance in object store 32) and two instances of each object associated with the pair of object stores 22 and 34 (one instance in object store 22 and one instance in object store 34). When a user changes one instance of the object stored in either object store 22 or 34, the second instance of that object in the other of stores 22 and 34 is out of sync and is desirably updated the next time mobile device 12 has two-way communication with computing device 14, so that both instances of the same object contain synchronized data. The same is true for instances of objects stored in object stores 20 and 32.

In order to accomplish synchronization, synchronization components 24 and 36 run on mobile device 12 and computing device 14, respectively. The synchronization components communicate with application programs 16, 18, 28 and 30 (or directly with the associated object stores) through well defined interfaces (discussed in greater detail below) to manage communication and synchronization.

Synchronization components 24 and 36 communicate with each other through two-way communication links 26 and 38. Communication links 26 and 38 are illustratively commercially available communication links using a suitable communications protocol. For instance, in one illustrative embodiment, mobile device 12 is connected to computing device 14 with a physical cable, which communicates using a serial communications protocol. Other communication mechanisms are also contemplated by the present invention, such as infra-red (IR) communication, direct modem communication, remote dial-up-networking communication, communication through commercially available network cards (i.e., using TCP/IP), remote access services (RAS), wireless modem, wireless cellular digital packet data (CDPD), or other suitable communication mechanisms. Although the communication links are shown as being internal to mobile device 12 and computing device 14, those skilled in the art will recognize that portions of the communication links exist outside of the devices. For example, the communication links can include communication servers located between mobile device 12 and computing device 14 and adapters such as mobile device cradles.

Techniques for synchronizing data through a two-way communication channel are well known in the art and any suitable means of synchronizing data can be used once the two-way communication channel is established between computing device 14 and mobile device 12.

Computing Device 14

Computing device 14 is only one example of a suitable computing device and is not intended to suggest any limitation as to the scope of use or functionality of the invention. Neither should computing device 14 be interpreted as having any dependency or requirement relating to any one or combination of components illustrated in the exemplary computing device 14.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
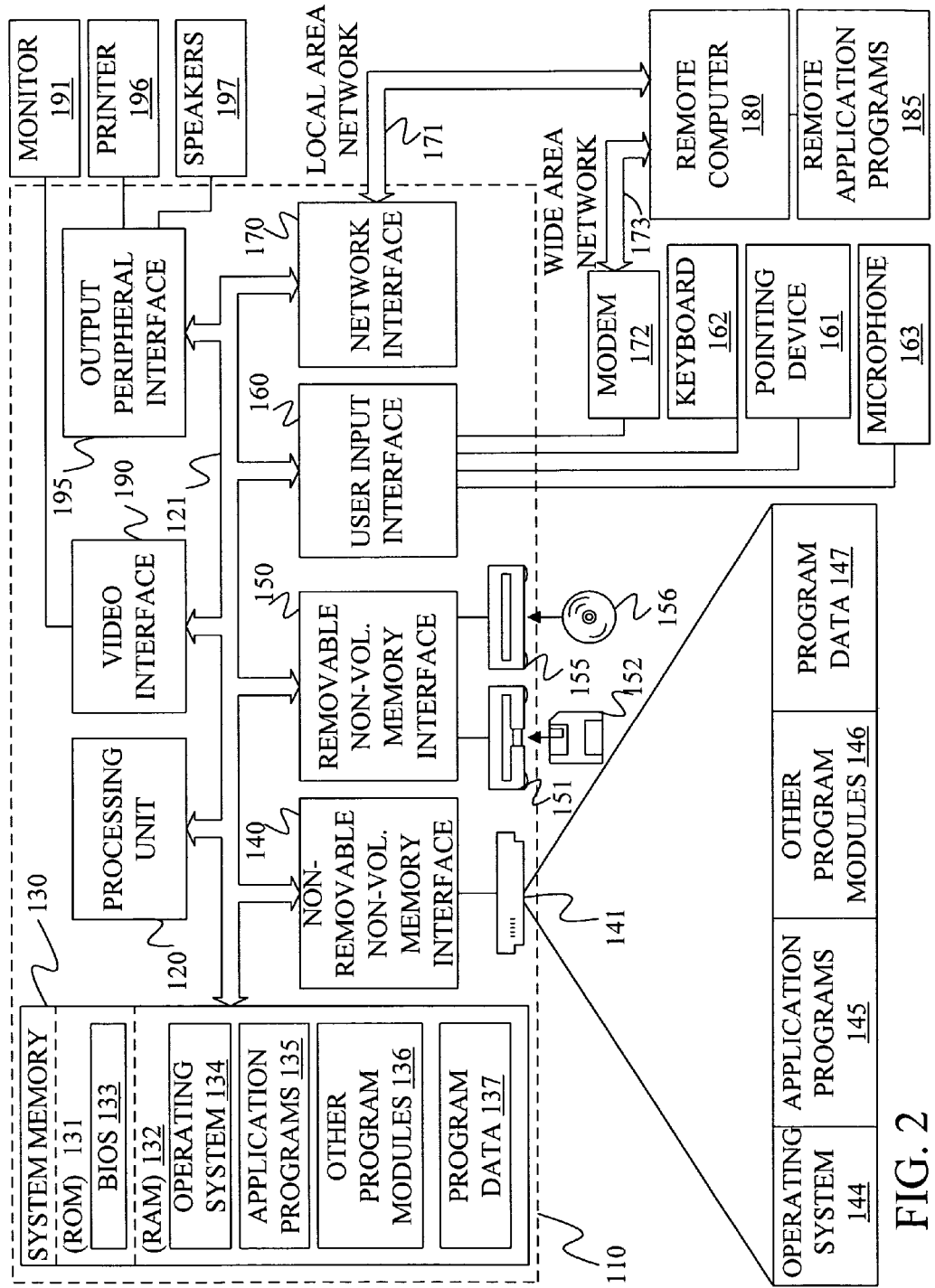
FIG. 2 is a block diagram of one embodiment of a computing device used in conjunction with a mobile device in accordance with the present invention.

With reference to FIG. 2, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180, which can include mobile device 12. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet. In addition, the network connections between any of the nodes in the network may include direct cable connections or wireless connections and the connection between computer 110 and remote computer 180 may include any number of nodes and/or routers.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

Mobile Device 12

Figure 3:
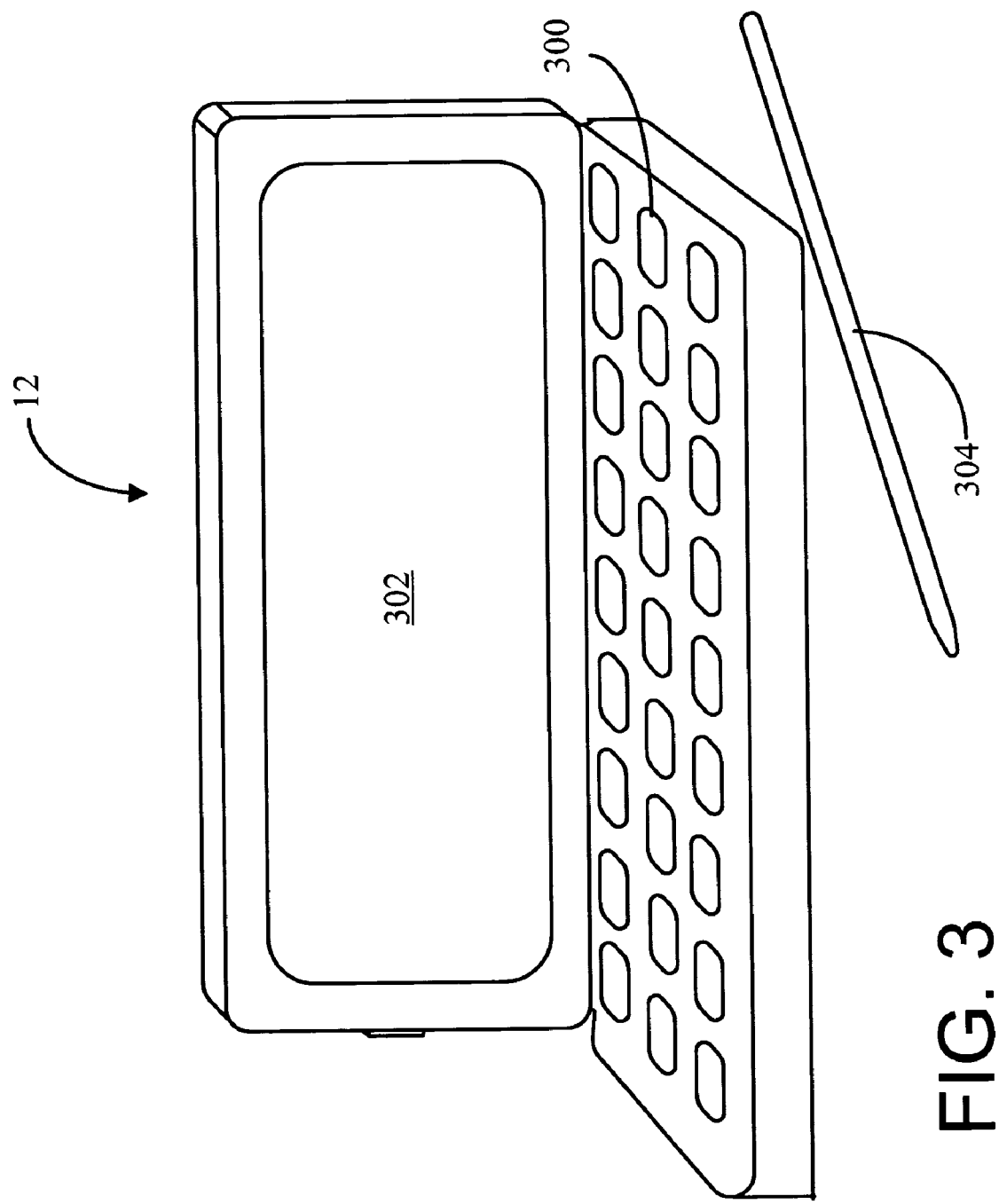
FIG. 3 is a simplified pictorial illustration of one embodiment of a mobile device in accordance with the present invention.

FIG. 3 is a simplified pictorial illustration of one preferred embodiment of a mobile device 12, which can be used in accordance with the present invention. In one embodiment, mobile device 12 includes a miniaturized keyboard 300, display 302 and stylus 304. In the embodiment shown in FIG. 3, display 302 is a liquid crystal display (LCD) which uses a contact sensitive display screen in conjunction with stylus 304. Stylus 304 is used to press or contact the display 302 at designated coordinates to accomplish certain user input functions. Miniaturized keyboard 300 is illustratively implemented as a miniaturized alpha-numeric keyboard, with any suitable and desired function keys, which are also provided for accomplishing certain user input functions.

Figure 4:
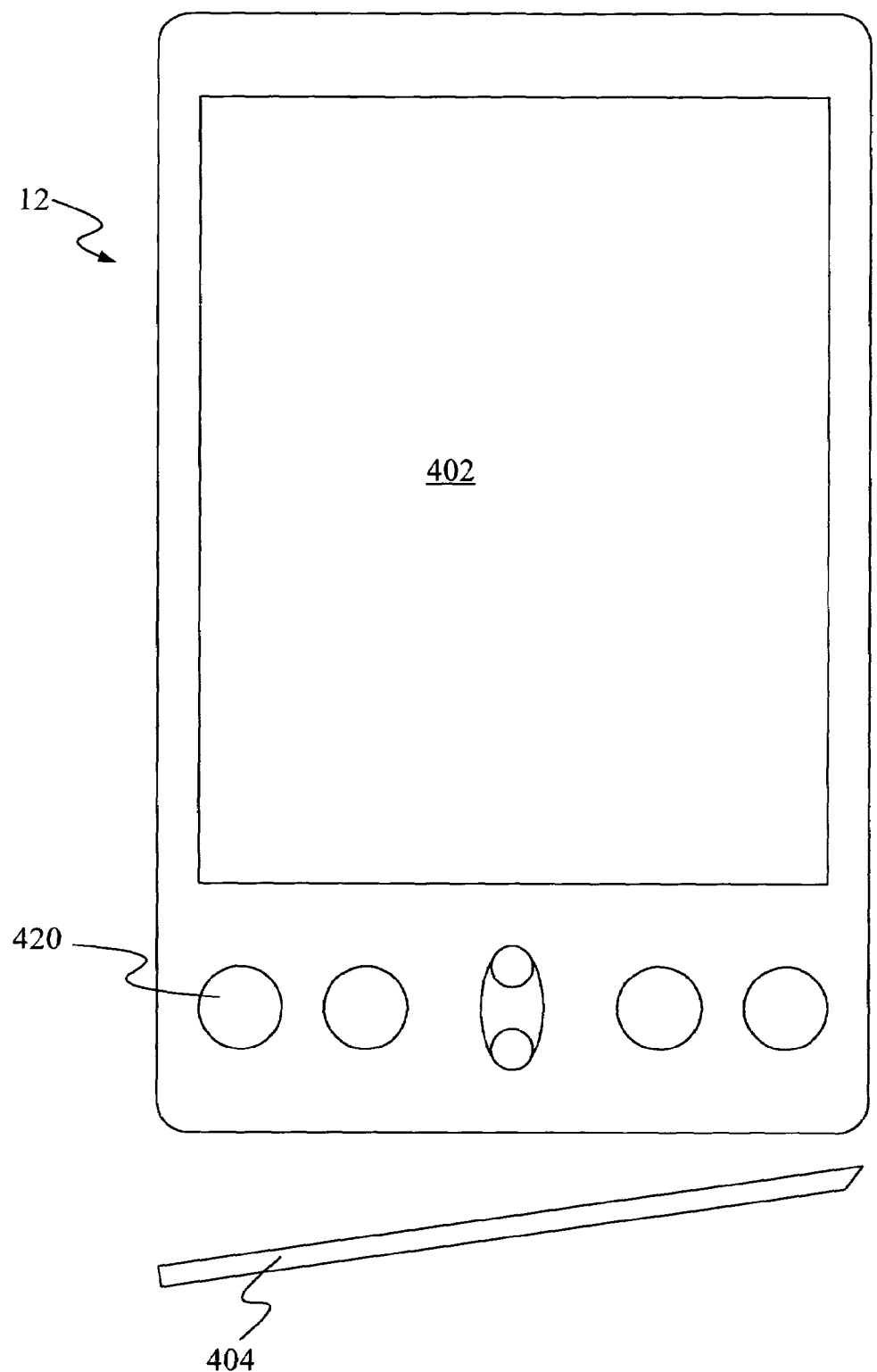
FIG. 4 is a simplified pictorial illustration of another embodiment of a mobile device in accordance with the present invention.

FIG. 4 is an illustration of a different embodiment of mobile device 12. Mobile device 12, as shown in FIG. 4, includes a screen 402 that can sense the position of stylus 404 relative to the screen and thereby allow the user to select objects on the screen as well as write and draw through the screen input.

It should be noted that the displays 302 and 402 for the mobile devices shown in FIGS. 3 and 4 can be the same size as one another, or different sizes from one another, but would typically be much smaller than a conventional display used with a desktop computer. For example, displays 302 and 402 shown in FIGS. 3 and 4 may be defined by a matrix of only 240×320 coordinates, or 160×160 coordinates, or any other suitable size. When mobile device 12 is a pager, the display may be even smaller.

The mobile device 12 shown in FIG. 4 also includes a number of user input keys or buttons, such as button 420, which allow the user to scroll through menu options or other display options which are displayed on display 402, or which allow the user to change applications or select user input functions, without contacting display 402.

Although not shown, mobile device 12 of FIG. 4 also includes an antenna that allows for wireless communication with the mobile device as well as one or more communication ports such as a serial or USB port, or a Local Area Network port.

Figure 5:
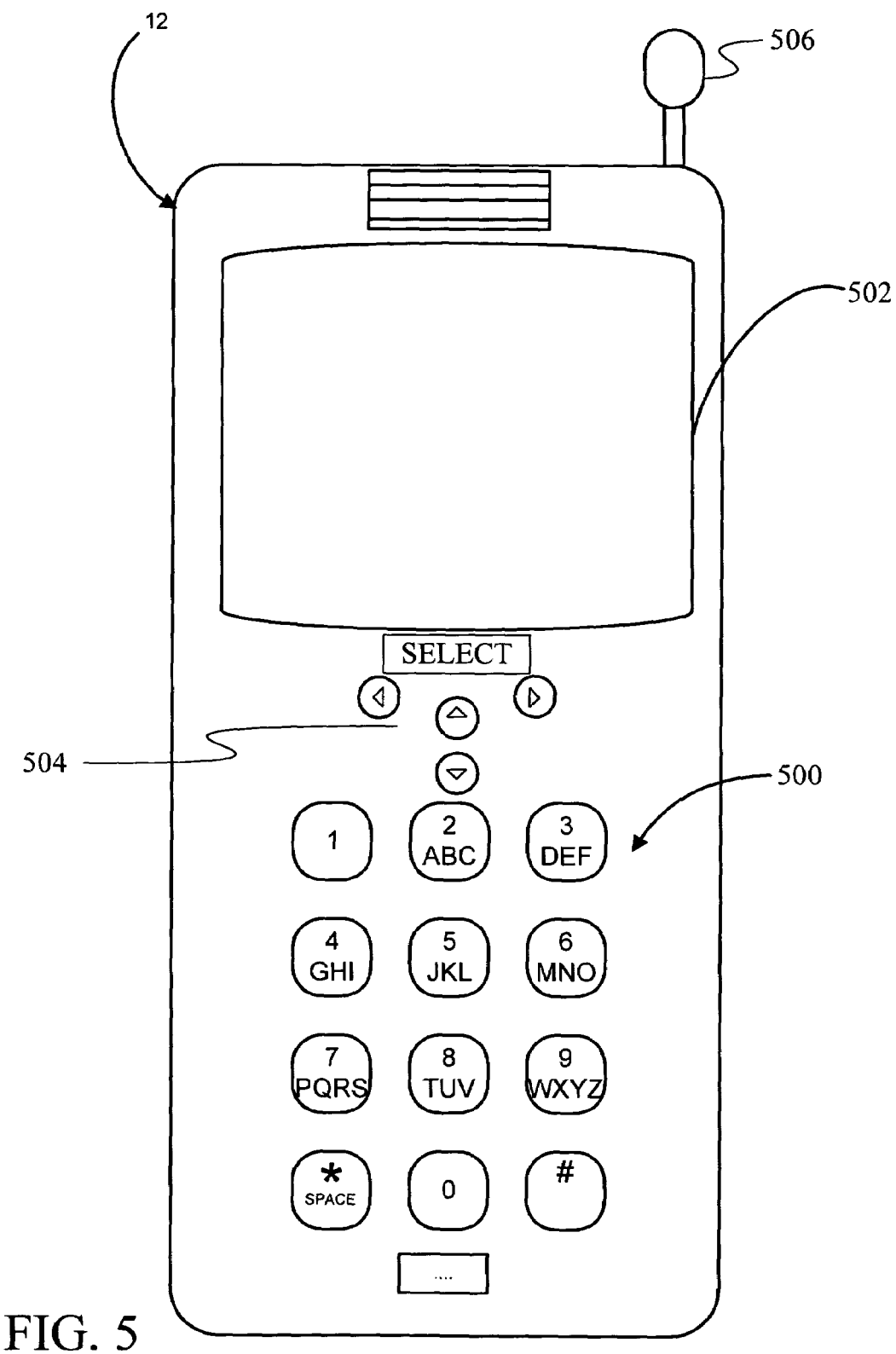
FIG. 5 is a pictorial illustration of a phone embodiment of a mobile device.

FIG. 5 provides a pictorial diagram of a phone embodiment of mobile device 12. The phone includes a set of keypads 500 for dialing phone numbers, a display 502 capable of displaying application and PIM images, and control buttons 504 for selecting items shown on the display. The phone includes an antenna 506 for receiving cellular phone signals such as General Packet Radio Service (GPRS) and 1Xrtt, and Short Message Service (SMS) signals. When using a cellular phone signal, the phone establishes a connection with a carrier. Generally, the carrier charges a fee based on the length of time that this connection is maintained.

Note that other forms of the mobile device are possible under the present invention. Examples include tablet PCs and wireless-enabled lap-top computers.

Figure 6:
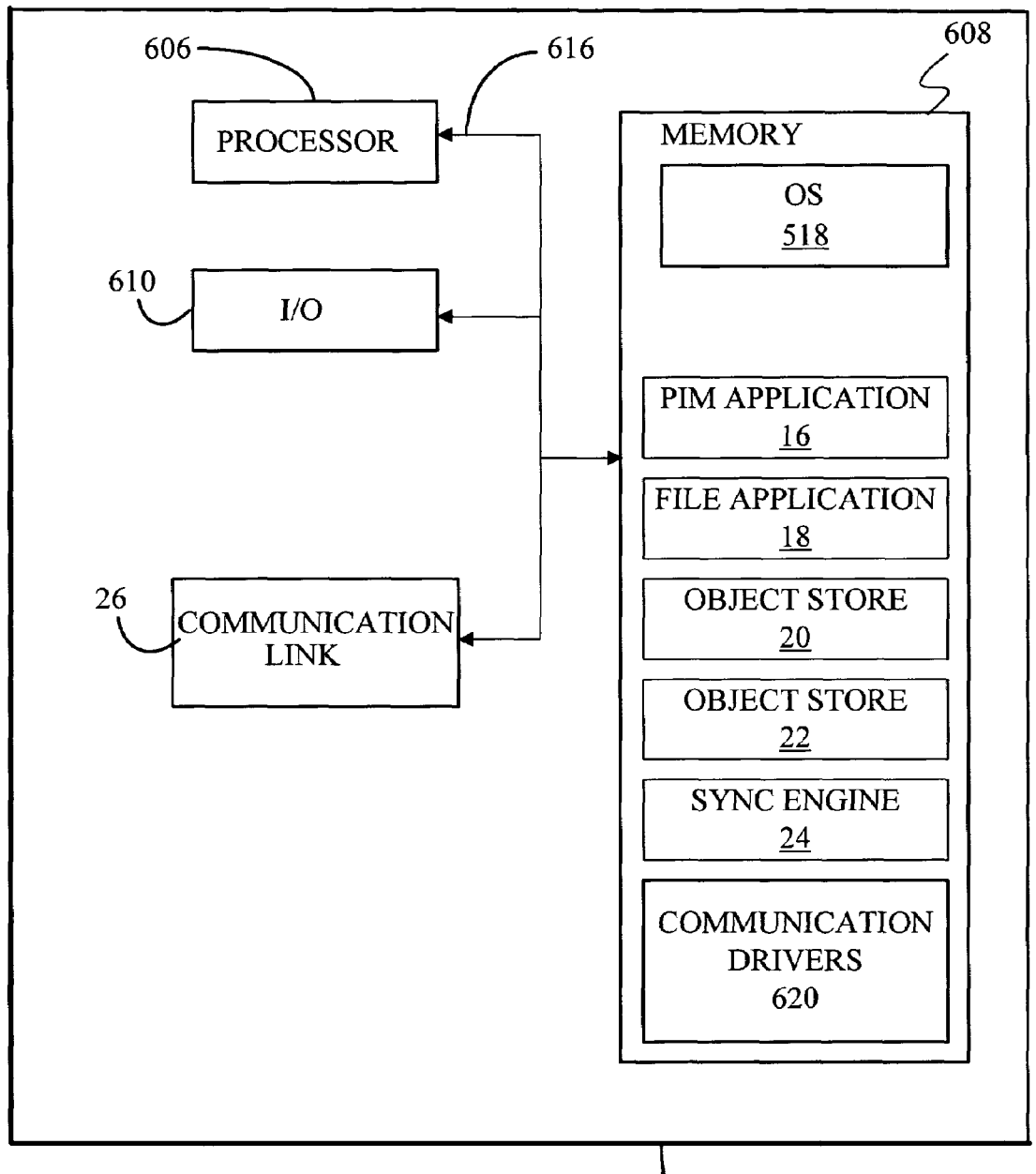
FIG. 6 is a simplified block diagram of one embodiment of a mobile device.

FIG. 6 is a more detailed block diagram of mobile device 12. Mobile device 12 illustratively includes microprocessor 606, memory 608, input/output (I/O) components 610, and communication links 26. These components of mobile device 12 can be coupled for communication with one another over a suitable bus 616.

Memory 608 is preferably implemented as nonvolatile electronic memory such as random access memory (RAM) with a battery back-up module (not shown) such that information stored in memory 608 is not lost when the general power to mobile device 12 is shut down. A portion of memory 608 is illustratively allocated as addressable memory for program execution, while another portion of memory 608 is optionally used for storage, such as to simulate storage on a disc drive.

Memory 608 can include operating system 618, one or more application programs (such as PIM 16 and file application 18, etc.), as well as object stores 20 and 22 and sync engine 24. During operation, operating system 618 is illustratively executed by processor 606 from memory 48. The operating system 618 implements features which can be utilized by PIM 16 and file application 18 through a set of exposed application programming interfaces and methods. The objects in object stores 20 and 22 are illustratively maintained by PIM 16, file application 18 and operating system 618, at least partially in response to calls to the exposed application programming interfaces and methods.

I/O components 610, in one embodiment, are provided to facilitate input and output operations from a user of mobile device 12. I/O components 610 for various embodiments of mobile device 12 can include input components such as buttons and touch sensors and output components such as a display, a speaker, and/or a printer port.

Communication link 26 is any suitable communication interface. Interface 26 is illustratively used to communicate with computing device 14 as described with respect to FIG. 1. Memory 608 includes a set of communication drivers 620 that interact with communication link 26 and that translate data to and from the appropriate communication protocol necessary to allow for communication across link 26.

Figure 7:
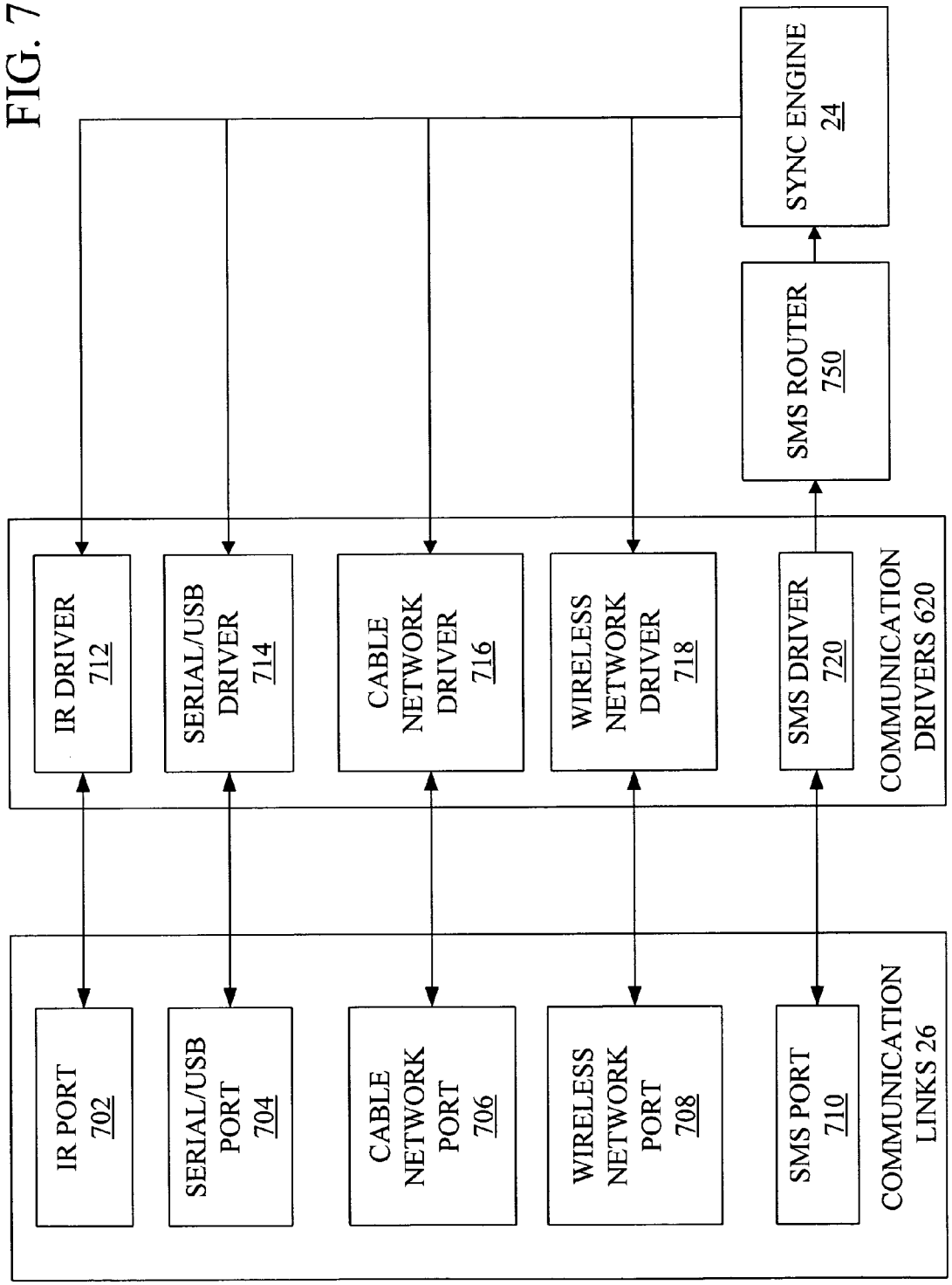
FIG. 7 is a more detailed block diagram of the communication links and communication drivers of FIG. 6.

FIG. 7 provides a block diagram showing communication link 26 and communication drivers 620 in more detail. In particular, FIG. 7 shows communication link 26 as containing a number of communication ports 702, 704, 704, 708 and 710 that communicate with devices outside of the mobile device. Each port has an associated driver 712, 714, 716, 718, and 720, respectively, in communications drivers 620. IR port 702 and IR driver 712 provide communication across an infrared communication channel between the mobile device and another computing device. Serial/USB port 704 and Serial/USB driver 712 provide communication over a serial or USB channel. Cable network port 706 and cable network driver 716 provide communication over a network cable such as an Ethernet cable.

Wireless network port 708 and wireless network driver 718 provide communication to a network over a radio channel. Wireless network port 708 and driver 718 can use any number of wireless network protocols including General Packet Radio Service (GPRS) and 1Xrtt, which are wireless services used to provide cellular access to a network, as well as 802.11 and 802.11b (Wi-Fi) protocols, and Bluetooth™ protocol, which provide local wireless connections to networks.

SMS port 710 and SMS driver 720 support one-way communication using the Short Message Service protocol. Thus, SMS port 710 is able to receive SMS messages that are broadcast using the radio spectrum.

Synchronization Notification

At times, it is costly to connect mobile device 12 to computing device 14 along a two-way channel in which both devices can send and receive data. For example, there can be a per minute charge for connecting mobile device 12 to computing device 14 over a cellular phone network using the wireless network port 708. Because of this, it is desirable to limit such connections between mobile device 12 and computing device 14.

The present invention reduces such connections by reducing the need for mobile device 12 to periodically connect to and poll computing device 14 for objects that need to be synchronized. Under one embodiment, this is achieved by sending a notification from computing device 14 to mobile device 12 along a less expensive communication channel.

Under one particular embodiment, the notifications are sent over a Short Message Service (SMS).

In general, SMS uses a broadcast system in which a message is addressed for a destination device and then broadcast to all devices. SMS is generally a one-way communication protocol so that the message is simply broadcast with no feedback that the mobile device received the message. This is one of the factors that make SMS less expensive than cellular connections. Note that although SMS is discussed herein, the present invention may be used with other one-way communication protocols. The important aspect of the invention is that a less expensive communication channel is used to send the notification than must generally be used to allow full synchronization between the mobile device and the computing device.

Figure 8:
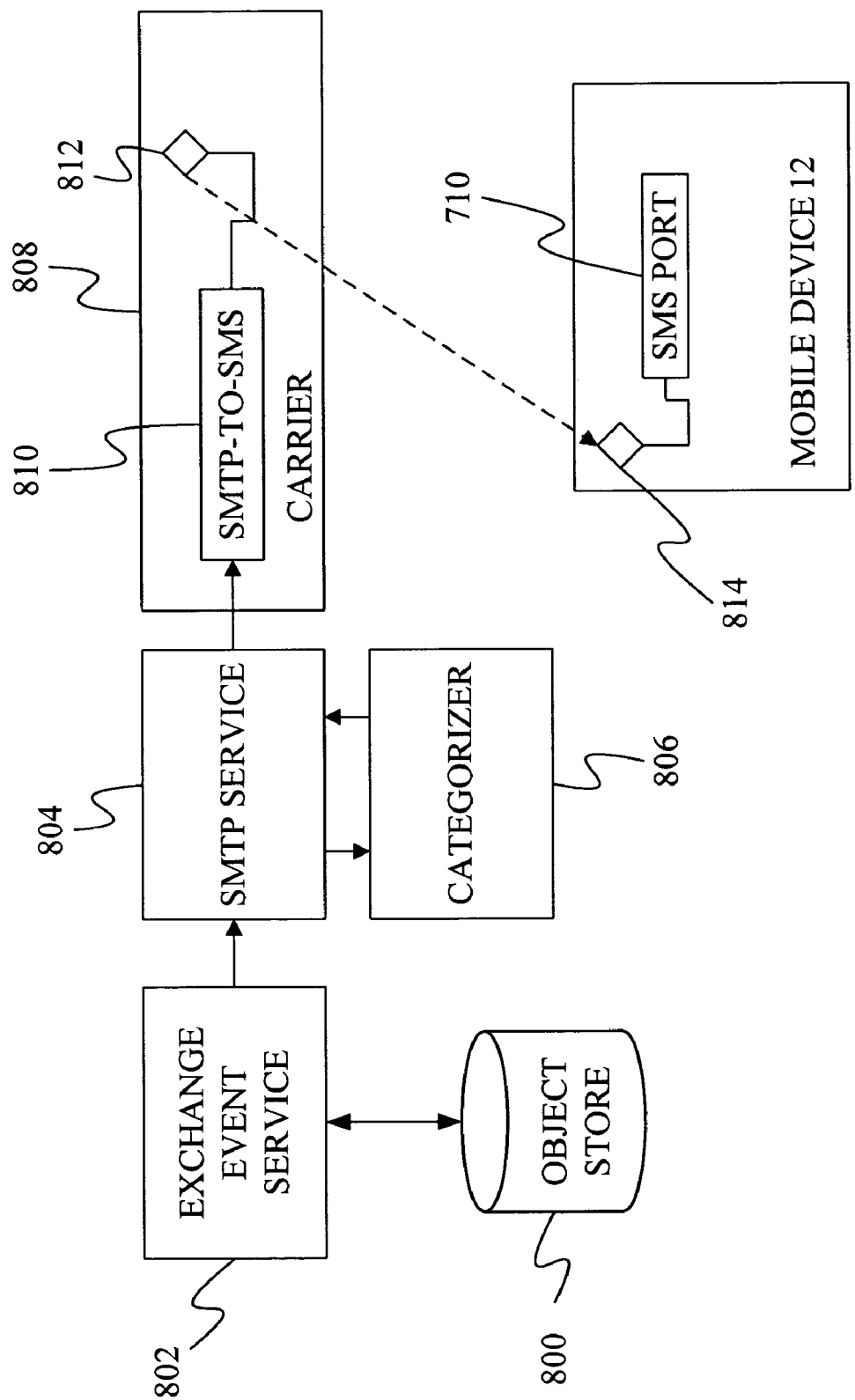
FIG. 8 is a block diagram of components used to send a synchronization notification under embodiments of the present invention.

FIG. 8 provides a block diagram of a system for sending synchronization notifications under one embodiment of the present invention. The operation of the system of FIG. 8 is discussed in the flow diagram of FIG. 9.

Figure 9:
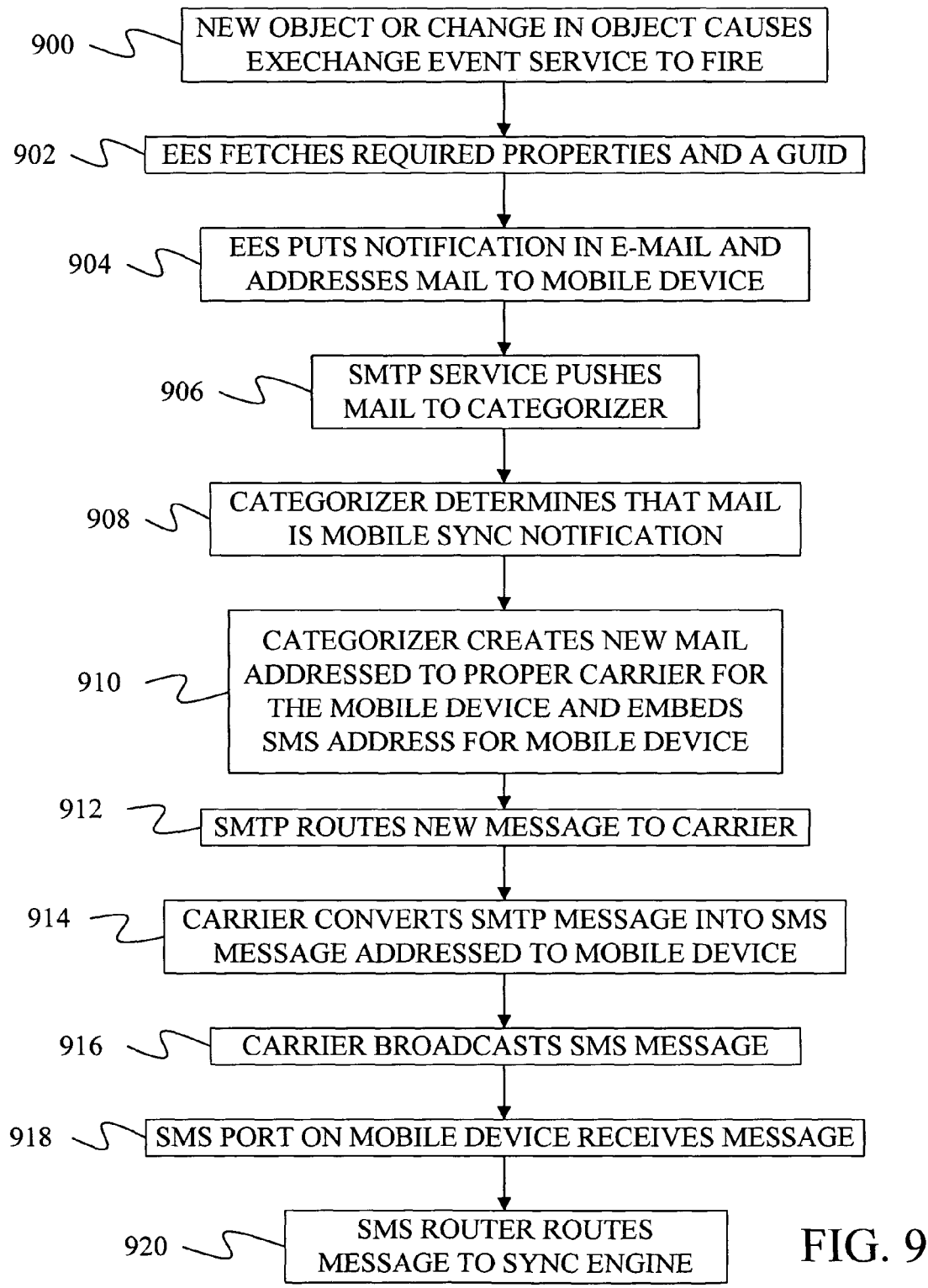
FIG. 9 is a flow diagram of a method of sending notifications under one embodiment of the present invention.

In step 900 of FIG. 9, a new object is added to an object store 800 or an existing object is changed in object store 800. The addition or changes cause an exchange event service 802 to execute. Under one embodiment, exchange event service 802 executes whenever there is a change in the objects held by a container object that exchange event service 802 is bound to. Such container objects are sometimes referred to as object stores above. In other embodiments, exchange event service 802 only executes after a minimum number of objects have been changed, added, or deleted. This helps reduce the number of synchronization notifications that are sent to the mobile device. In some embodiments, the number of changes required to trigger a synchronization notification is set by the user.

Exchange event service 802 may be bound to many different types of container objects including container objects for e-mail, contacts, calendar, and tasks. For example, exchange event service 802 can be bound to an inbox mailbox folder such that when a new e-mail is added to the inbox folder, an instance of exchange event service 802 is started. Exchange event service 802 may be located on computing device 14 or may be located on a separate computing device that is connected to computing device 14. Under one embodiment, where the synchronization involves a user's e-mail inbox, the exchange event service is located on the same server as the inbox.

After being started, exchange event service 802 retrieves the properties of the object that has been changed or added and a Globally Unique Identifier (GUID) at step 902. The Globally Unique Identifier is a token that validates that this notification is authentic—not spoofed or replayed by a third party. It allows short, efficient notifications without the need for large security overhead. The properties of the object typically include an identifier of the container object and an identifier of an object within the container object that has changed, been deleted or been added.

Exchange event service 802 places the properties and the GUID in an e-mail message using the Simple Mail Transfer Protocol (SMTP) at step 904. The e-mail message is addressed by exchange event service 802 to indicate that the notification is to be routed to the mobile device. In most embodiments, the address does not provide the communication path to the mobile device but instead simply identifies the mobile device.

The e-mail message is sent to an SMTP service 804, which pushes the message to a categorizer 806 at step 906. SMTP service 804 and categorizer 806 may be located on computing device 14 or may be located on a separate computing device. In addition, SMTP service 804 and categorizer 806 may be located on the same computing device as exchange event service 802 or on a separate device.

Categorizer 806 scans the message and determines that the message is a mobile sync notification at step 908. Based on this determination, categorizer 806 creates a new mail message at step 910 addressed to the mobile device through a carrier that is able to communicate with the mobile device. Examples of such carriers include mobile phone carriers and paging network carriers. The message also includes WDP information including a WDP port on the mobile device that is used to receive server notifications. This information is formatted according to the WAP specification and allows the carrier to identify the SMS address of the mobile device. The message also contains the properties and GUID found in the original SMTP message.

SMTP service 804 routes the new message created by categorizer 806 to a carrier 808 at step 912 based on the address provided by categorizer 806. At step 914, a SMTP-to-SMS conversion module 810 at carrier 808 converts the SMTP message into Short Message Service (SMS) text format and addresses the SMS message for broadcast to the mobile device. This conversion is made based on the address to which the SMTP message is sent. The SMS message is then broadcast using antenna(s) 812 at step 916.

At step 918, the message is received by an antenna 814 in mobile device 12 and is handled by SMS port 710. As shown in FIG. 7, SMS port 710 instantiates SMS driver 720, which decodes the SMS message and provides the decoded message to SMS router 750. At step 920, router 750 scans the SMS message and determines that it is a synchronization notification. Based on that determination, SMS router 750 routes the SMS message to sync engine 24.

Sync engine 24 first authenticates the GUID in the SMS to determine if this is a spoofed or replayed SMS message. This is done by comparing the GUID to the GUIDs of other SMS messages that have been received. If the GUIDs match exactly, this is likely a replayed SMS message and can be ignored. The GUID is also compared to the GUIDs of the containers on the mobile device. If the GUID does not correlate to any of the containers on the mobile device, it can be considered a spoofed SMS message and can be ignored.

After the GUID has been authenticated, sync engine 24 makes a determination as to whether to initiate a synchronization. In some embodiments, this determination is made in part based on user preferences. Thus, a user may set a minimum number of notifications that must be received before synchronization is to begin, or a minimum time period that must elapse since the last synchronization.

If synchronization is to be performed, sync engine 24 instantiates an appropriate driver to make a two-way communication connection with computing device 14. For example, sync engine 24 may instantiate wireless network driver 618 to establish a wireless connection with computing device 14 or with a network attached to computing device 14. Using this connection, the synchronization can then be performed.

Under embodiments of the present invention, the notifications can have different levels of information. The lowest level of notification simply indicates that something has changed but does not indicate what has changed or how it has changed. In a second level of notification, the notification identifies the object that has changed but does not provided details as to how the object has changed. In a third level of notification, the notification includes the identity of the object that changed and how it changed. For third level notifications, mobile device 12 does not need to establish a two-way communication channel with computing device 14 to synchronize the change because mobile device 12 can simply synchronize based on the information contained in the notification.

Although the present invention has been described with reference to preferred embodiments, workers skilled in the art will recognize that changes may be made in form and detail without departing from the spirit and scope of the invention.

What is claimed is:

1. A method of determining whether to establish a synchronization connection on a mobile device, the method comprising:
   determining that there is data on a computing device to be synchronized with data on the mobile device;
   broadcasting a notification indicating that there is data to be synchronized to the mobile device using a one-way communication channel, the notification comprising a globally unique identifier for a container;
   receiving the notification at the mobile device; and
   based in part on the notification, deciding whether to initiate a connection to a computing device for the purpose of synchronization by comparing the globally unique identifier to globally unique identifiers of containers stored on the mobile device and by comparing the globally unique identifier to globally unique identifiers in previous notifications.

2. The method of claim 1 wherein broadcasting a notification comprises broadcasting a short message service message.

3. The method of claim 2 wherein broadcasting a short message service message comprises sending a simple mail transfer protocol message to a carrier, converting the simple mail transfer protocol message into the short message service message, and transmitting the short message service message.

4. The method of claim 3 wherein sending a simple mail transfer protocol message to a carrier comprises addressing a simple mail transfer protocol message an using an identifier that identifies the mobile device, determining that the simple mail transfer protocol message is a synchronization notification, and generating a second simple mail transfer protocol message with a different address.

5. The method of claim 1 wherein determining that there is data on a computing device to be synchronized comprises receiving a mail message in a mail folder.

6. The method of claim 1 wherein determining that there is data on a computing device comprises instantiating an exchange event service based on a change to a data object.

7. The method of claim 6 wherein the exchange event service is bound to a container object and executes when an object in the container object changes.

8. The method of claim 7 wherein the exchange event service is located on a same computing device as the container object.

9. The method of claim 1 wherein the mobile device is a phone.

10. The method of claim 1 wherein broadcasting a notification comprises broadcasting a notification that indicates the identity of an object that has changed.

11. The method of claim 10 wherein broadcasting a notification further comprises broadcasting a notification that indicates how the object has changed.

12. The method of claim 1 wherein deciding whether to initiate a connection comprises waiting until a minimum number of notifications have been received at the mobile device, wherein the minimum number is greater than one.

13. The method of claim 1 wherein determining that there is data to be synchronized comprises determining that at least two objects have been changed on the computing device.

* * * * *

UNITED STATES PATENT AND TRADEMARK OFFICE
CERTIFICATE OF CORRECTION

| | | |
|---|---|---|
| PATENT NO. | : 7,366,796 B2 | Page 1 of 1 |
| APPLICATION NO. | : 10/645793 | |
| DATED | : April 29, 2008 | |
| INVENTOR(S) | : Gary Hall et al. | |

It is certified that error appears in the above-identified patent and that said Letters Patent is hereby corrected as shown below:

In column 12, line 3, in Claim 4, before "using" delete "an".

Signed and Sealed this
Twelfth Day of April, 2011

David J. Kappos
*Director of the United States Patent and Trademark Office*